United States Patent [19]

Mir

[11] 4,375,648

[45] Mar. 1, 1983

[54] HIGH-RESOLUTION LIGHT VALVE APPARATUS FOR ELECTRONIC IMAGING

[75] Inventor: José M. Mir, Rochester, N.Y.

[73] Assignee: Eastman Kodak Company, Rochester, N.Y.

[21] Appl. No.: 268,973

[22] Filed: Jun. 1, 1981

[51] Int. Cl.³ .............................................. H04N 1/22
[52] U.S. Cl. ......................................... 358/75; 355/4
[58] Field of Search ...................... 358/75, 78, 60, 61, 358/213, 285, 286, 296, 300, 302; 355/4, 5, 18, 32, 37, 38, 67, 70, 71; 350/3.6, 3.7, 3.71, 3.72, 3.73, 370, 374, 378, 380, 400, 403; 353/20

[56] References Cited

U.S. PATENT DOCUMENTS

| | | | |
|---|---|---|---|
| 3,711,180 | 1/1973 | Klinger | 358/61 |
| 4,129,357 | 12/1978 | Title | 350/403 |
| 4,229,095 | 10/1980 | Mir | 358/75 |
| 4,316,196 | 2/1982 | Jacobs | 350/356 |

Primary Examiner—Michael A. Masinick
Attorney, Agent, or Firm—John D. Husser

[57] ABSTRACT

Light valve imaging apparatus utilizes an area light valve array to effect high pixel resolution exposure of a line of record medium passing through an area exposure region during a plurality of partial-line-exposure subperiods.

8 Claims, 7 Drawing Figures

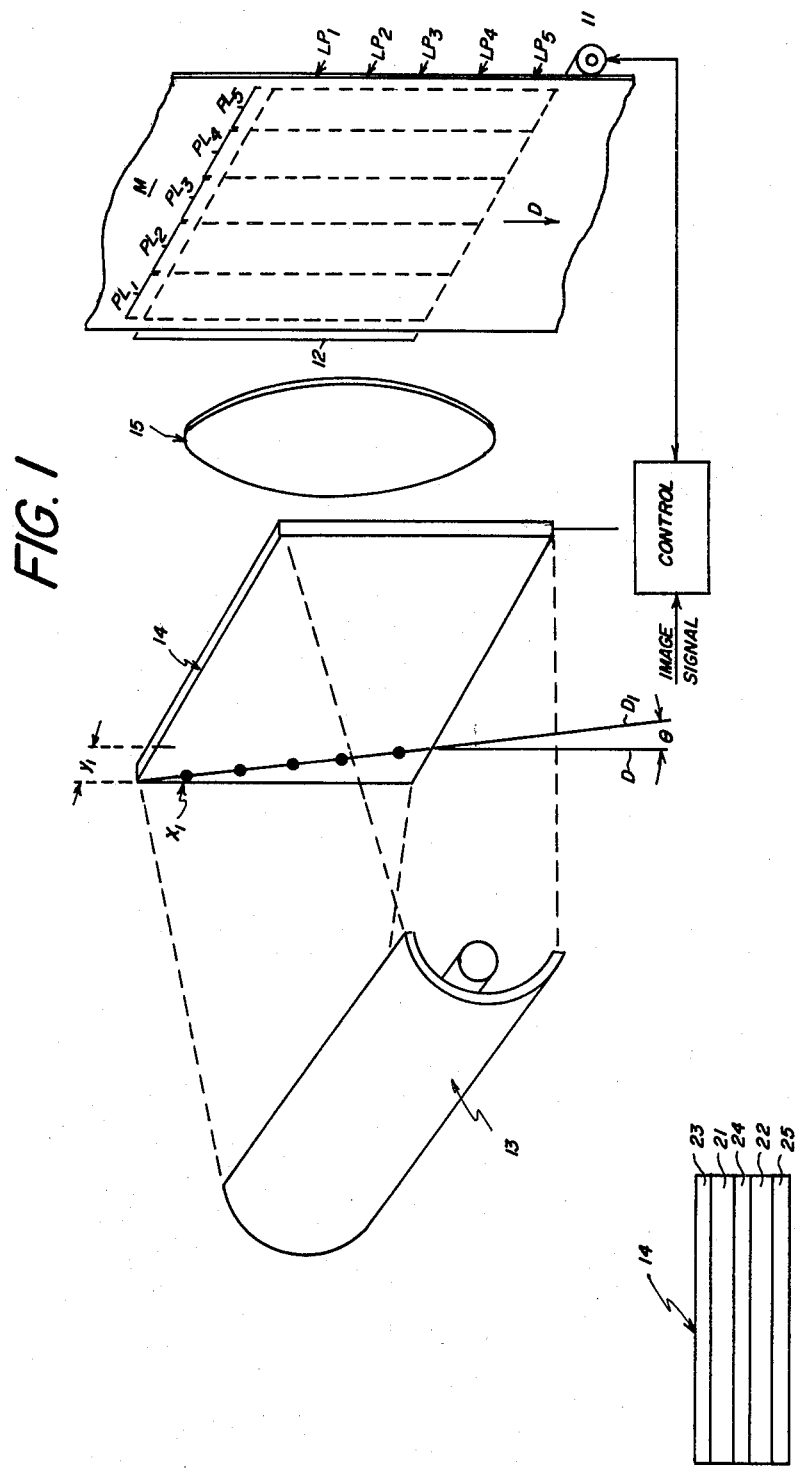

HIGH-RESOLUTION LIGHT VALVE APPARATUS FOR ELECTRONIC IMAGING

CROSS-REFERENCE TO RELATED APPLICATIONS

Reference is hereby made to U.S. Pat. application Ser. No. 230,097, entitled "Electronic Imaging Apparatus with Light Valve Area Arrays" and filed Jan. 29, 1981, in the names of Mir, Varner and Kurtz.

BACKGROUND OF THE INVENTION

1. Field of the Invention

The present invention relates to electronic imaging and more particularly to improvements in the electrooptic modulator and addressing electrode structure of light valve devices which provide simplified, high resolution, optical address of pixels (picture elements).

2. Description of the Prior Art

Recently, it has been found that light valve array devices provide a highly useful vehicle in electronic imaging. One preferred light valve configuration comprises a piece of ferro-electric ceramic material, such as lanthanum-doped lead zirconate titanate (PLZT), which is sandwiched between crossed polarizers and electrically activatible to operate in a Kerr cell mode. An array of such light valves comprises such crossed polarizers and a panel of PLZT material that has a plurality of electrodes formed on one of its major surfaces. The electrodes are arranged in a manner facilitating the selective application of discrete electrical fields across (in a direction perpendicular to the direction of viewing) discrete surface areas which constitute pixel portions of the panel. Upon application of such fields, the PLZT material becomes birefringent and rotates the direction of polarization of incident light by an extent dependent on the field magnitude. This results in transmission of light through the PLZT pixels and cooperating polarizers varying as a function of the respective addressing fields.

U.S. Pat. No. 4,229,095 discloses various embodiments of electronic color-imaging apparatus that utilize such light valve arrays to effect multicolor exposure of panchromatic recording media. For example, a color image is formed electronically by selectively opening and closing individual light valves of such arrays in synchronization with the energization of red, green and blue exposing sources and according to the red, green and blue color information for the pixels of that image. One preferred embodiment disclosed in that patent comprises a linear light valve array disposed in spaced transverse relation to the recording media feed path. The pixels of the array are addressed concurrently with image information, a line at a time; and the movement of the recording medium and the red, green and blue color exposures are synchronized with successive actuations of the linear array.

It can be appreciated that light valve arrays must address many image pixels per line in order to form images having even moderate detail. The number of pixels per line increases in accordance with the resolution requirements of the imaging application, e.g. becoming as large as 250 pixels per inch or larger for high quality continuous tone imaging. Each pixel of the recording medium must be independently addressable with light in accordance with the unique content of the image to be reproduced. Therefore, discretely-activatible electrode means has been provided for each pixel portion of the light valve array, and each electrode means has had its own high voltage "off-on" switch, e.g. a transistor amplifier. The cost and complexity of these many switches and their connection and packaging present problems in electronic imaging with light valve devices.

Another problem encountered in fabricating light valve array devices relates to the electrooptic modulator panel, which is commonly formed as a linear strip having a length dimension sufficient to transverse an image exposure or scan zone. Although such linear modulator strips theoretically can be quite small in area (viz., the exposure zone length times one pixel in width), practical fabrication, handling and electronic packaging considerations militate toward a greater width. For example, while the width of the strip could be on the order of 0.1 mm from an optical viewpoint, difficulties are presented in fabricating and handling modulator strips less than 10 mm in width. Thus, there is a "waste" of modulator material, which is expensive.

SUMMARY OF THE INVENTION

A significant purpose of the present invention is to provide simplified light valve construction for optically addressing high resolution pixels, e.g. in electronic imaging apparatus. One advantage of the present invention is that it facilitates simplified electronic addressing structure. Another advantage of the present invention is that it utilizes a two-dimensional modulator panel, which (compared to a linear array of equivalent pixel density) is more convenient and economical to fabricate.

Thus the present invention provides improvements in electronic imaging apparatus of the kind having an image station, means for directing uniform illumination along an optical path toward the image station, means for transporting photosensitive recording medium through said image station and light valve means for modulating the passage of such light in accordance with an image to be reproduced. In one general aspect such improvements comprise configuring such image station as a multi-line exposure zone and optically addressing each line of recording medium passing through that zone in a plurality of partial-line sub-periods with an "x-y" addressable area light valve array.

In one more specific aspect, such address is effected by an area light valve array of the kind having two electrooptic panels with linear electrodes defining electrically-activatible modulator strips and sandwiching polarizing means cooperating with the panels to control light passage in response to the activation of such modulator strips. The light valve array is located with respective strips of the two panels generally orthogonal and the strips of one of the panels extending across the projection of said exposure zone from its entrance region to its exit region at an oblique angle to the direction of recording medium transport.

In a preferred embodiment, such array is addressed by control means for: (1) receiving an electrical signal containing image information, (2) activating all modulator strips of one of said panels sequentially during each partial-line sub-period and (3) during each sequential activation of said one panel, activating the modulator strips of the other of said panels in accordance with partial-line image information for each line then at the print station.

BRIEF DESCRIPTION OF THE DRAWINGS

The subsequent description of preferred embodiments of the invention refers to the attached drawings wherein:

FIG. 1 is a perspective schematic view of one embodiment of the present invention;

FIG. 2 is a cross-sectional view of an area light valve array in accordance with a preferred embodiment of the present invention;

DETAILED DESCRIPTION OF THE PREFERRED EMBODIMENTS

Figure 3:
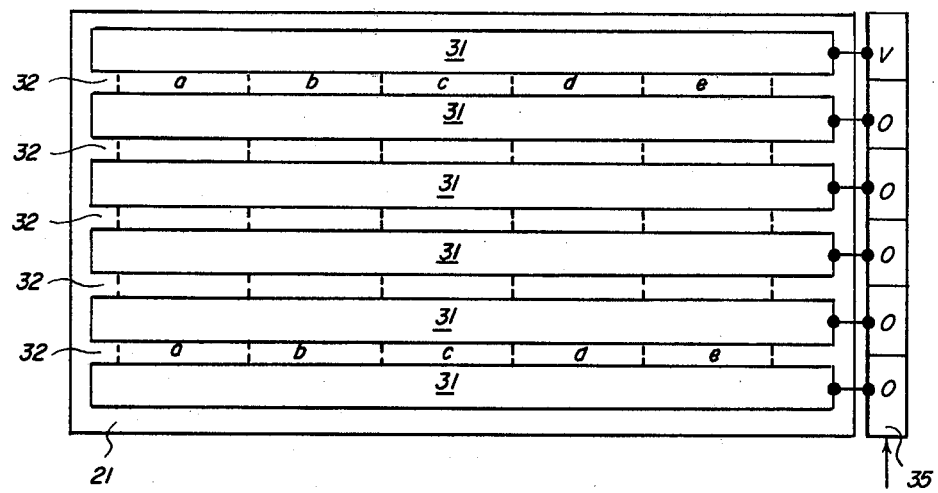
FIGS. 3 and 4 are plan views showing electrode configurations of one preferred embodiment of an area light valve array in accordance with the present invention.

Referring now to FIG. 1, there is illustrated one embodiment of electronic imaging apparatus 10 in accordance with the present invention. In general, the apparatus includes transport means 11 for moving a sheet or web of photosensitive recording medium M, in a direction D, through a two-dimensional (i.e., area) exposure station 12. An illuminating means 13 directs uniform illumination toward exposure station 12 and an area light valve array 14 is located along that optical path in a position to intercept and control light passing toward the exposure station. Lens means 15 is located between the area array 14 and the exposure station for imaging the array onto sections of recording medium M at the exposure station. Such lens means can take various forms, e.g. gradient index fiber optic bundles, lenticular arrays etc., and the FIG. 1 lens representation is merely schematic.

Referring to FIG. 2, area light valve array 14 is shown in more detail in cross section. There it can be seen that the array comprises first and second electrooptic modulators 21 and 22 and entrance, intermediate and exit light polarizing means 23, 24 and 25. It will be appreciated that dimension and configuration of the modulators and polarizing means will vary depending upon the application in which the array is to be used. Generally, the elements will be approximately uniform in their major dimension. The modulators and polarizing means are illustrated along a straight optical path; however, it will be appreciated that various mirrors, prisms, etc. could be arranged to define a different optical path between these elements.

The modulators 21 and 22 are formed of electrooptic material of the type which transforms from a nonpolar, optically-isotropic state to a polar, strongly-birefringent state when an electrical field is applied thereacross. PLZT ferroelectric ceramic of a kind known in the art (see, e.g., U.S. Pat. Nos. 3,612,656; 3,998,523 and 4,053,207) is a preferred class of material; however, there are various other well known materials which exhibit the desired electrooptic behavior described above. A particularly preferred material is 9/65/35 PLZT. The area modulators can be formed as a unitary panel or as a plurality of separate panels, e.g., strips supported together to define a two-dimensional imaging area.

The polarizing means preferably are selected from various known materials such as sheet polarizer materials which exhibit dichroism e.g. Polaroid sheet polarizers. In certain applications other light polarizing techniques such as Nichol prisms and Brewster mirrors may be used.

As shown in FIG. 2, the modulators and polarizing means are arranged along their common optical path in a predetermined sequence and orientation. Specifically, the first modulator 21 is located between entrance polarizing means 23 and intermediate polarizing means 24 and the second modulator 22 is located between polarizing means 24 and exit polarizing means 25. It is to be noted that the polarizing means each can comprise multiple sheet polarizers with aligned directions of polarization as indicated. In this regard, I have found an increase in contrast ratio is obtained when intermediate polarizing means 24 comprises two sheet polarizers aligned e.g. in the direction indicated in FIG. 2. Usually it will be desirable to dispose the elements in closely spaced relation; however, in certain embodiments other light directing optical elements can be interposed along the optical path. It is important that the polarization direction of the entrance and exit polarizing means 23 and 25 be the same and that the polarization direction of the intermediate polarizing means 24 be orthogonal to those of the other polarizing means.

Figure 4:
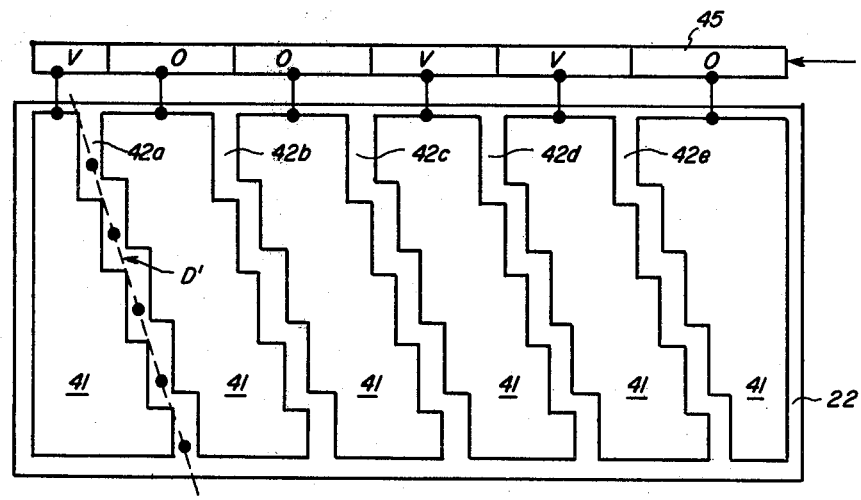

FIGS. 3 and 4 illustrate one preferred embodiment of modulator panel address means in accordance with the present invention. Thus it can be seen in FIG. 3 that in this embodiment modulator 21, which functions as the line address modulator, has a plurality of opaque, linear line-address-electrodes 31 extending across its surface in uniformly spaced relation so as to define a plurality of spaced electrooptic strips 32 therebetween. Each of these line address strips 32 includes a plurality of commonly-activatible, partial-line address zones a, b, c, d and e (denoted in FIG. 3 only on the top and bottom strip 32). The electrodes 31 are coupled to line address means 35, which can be a shift register or resettable counter. As illustrated, the address means is adapted to activate each of the strips 32 of the panel 21 in a sequential order by selectively providing a field thereacross. Thus in the illustrated stage top strip 32 is activated by virtue of voltage "V" being applied to one contiguous electrode and ground "O" applied to the other contiguous electrode. As described in more detail subsequently, this condition shifts sequentially so that each strip 32 is activated during each partial-line sub-period.

Referring now to FIG. 4, the modulator 22, which functions as the information address modulator, includes a plurality of opaque, strip electrodes 41 extending across its surface in spaced relation so as to define a plurality of spaced electrooptic strips 42(a–e) therebetween. Each strip 42(a–e) includes a plurality of commonly-activatible, pixel portions (generally indicated by the dots in the left strip 42a). The electrodes 41 are coupled respectively to elements of information address means 45 (e.g. a shift register having exclusive "or" logic) which is adapted to activate the strip portions 42 concurrently in accordance with partial-line image information. As will be described further below, such concurrent partial-line image addressings of electrodes 41 by information address means 45 occur in timed relation with each sequential activation of the line address means 35.

For example, consider one such sequential address within a partial-line sub-period (viz. one corresponding to the activation of the top strip 32 of modulator 21 is activated). At this stage address means 35 activates the top strip as shown and shift register 45 activates strips 42 in accordance with the input information as shown (strip 42a—activated; strip 42b—non-activated; strip 42c—activated; strip 42d—non-activated and strip 42e—activated). Considering this condition in connection with FIGS. 1 and 2, it can be understood that light will expose pixels in partial-line zones PL$_1$, PL$_3$ and PL$_5$ of the line position region LP$_1$ of the exposure station 12. Specifically, light passing polarizer 23 is rotated 90° by the top strip portion 32 of modulator panel 21 and thus passes intermediate polarizer 24 while the remaining light (passing other non-activated strips 32) does not. Next, the light passing intermediate polarizer 24 encounters information panel 22 and is rotated 90° by activated strip portions 42a, 42c and 42e. This light passes exit polarizer while the light passing sections 42b and 42d is not rotated and does not pass the exit polarizer. A similar addressing occurs for each of the strips 32 (which correspond to line positions LP$_1$-LP$_5$ of the exposure station) during each partial-line sub-period (i.e. the period for each of the lines of recording medium within the exposure station, LP$_1$-LP$_5$, to be exposed with one sequence of partial-line information. Considering the progress of the record medium line at LP$_1$ through positions LP$_2$-LP$_5$ it will be appreciated that successive partial-line information will be addressed thereon at each position during subsequent partial-line sub-periods. The partial-line information addressed at each position LP$_1$-LP$_5$ combines to provide a complete line of information.

One significant aspect of the present invention remains to be explained. Thus, note that the lines of pixel portions within each strip 42 of modulator 22 are at an oblique angle with respect to the direction of transport of the recording medium through the exposure station. The angle of such offset is determined by the number of pixels of the strip and the length of the exposure zone, the general purpose being to provide a complete address of each partial-line portion by a strip 42 by the end of the exposure zone. The cumulative partial-line address by all strips 42 then will provide complete address (and proper pixel-by-pixel exposure) of a complete image line. It will be appreciated by one skilled in the art that the information input to electrodes 41 (i.e. for imagewise activation of strips 42) will be for different lines during each of the sequential activations of the strips 32 of modulator 21. This is accomplished by appropriate signal formatting software or hardware in control 50 (or if desired by a scan system operating with a photodetector array and a light valve scanner having an identical address routine). Also, it will be appreciated that multicolor exposures can be effected with the above-described apparatus by e.g. simply breaking each partial-line sub-period into a plurality of successive color sub-periods with different color information applied to the information modulator as appropriate for the color image to be reproduced.

Although the light valve embodiment shown in FIGS. 3 and 4 is highly advantageous for many applications, it is not highly light efficient. That is much of the incident light is not utilized in imaging because it is blocked by electrodes 41. The aspect ratio A between the electrodes 41 and active regions 42 is dictated by the following relationship:

$$A = \frac{\text{Width (42)}}{\text{Width (41)}} = \frac{1}{N}$$

where N is the number of active regions 32 of opposing electrode 31. Thus for the light valve illustrated in FIGS. 3 and 4, A would be equal to $1 \div 5 = 0.20$. This indicates that for each exposed pixel only 20% of the light is utilized and the larger the multiplexing (i.e. the greater N is, the less light is utilized).

Figure 7:
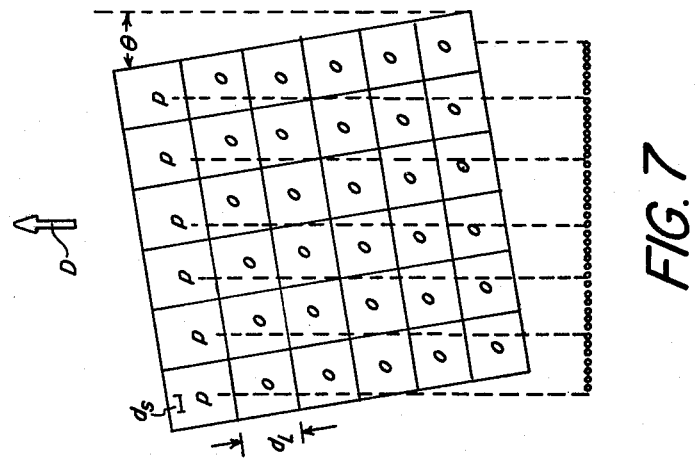
FIG. 7 is a diagram illustrating the disposition relative to the transport path and mode of operation of the FIG. 5 embodiment.
Figure 5:
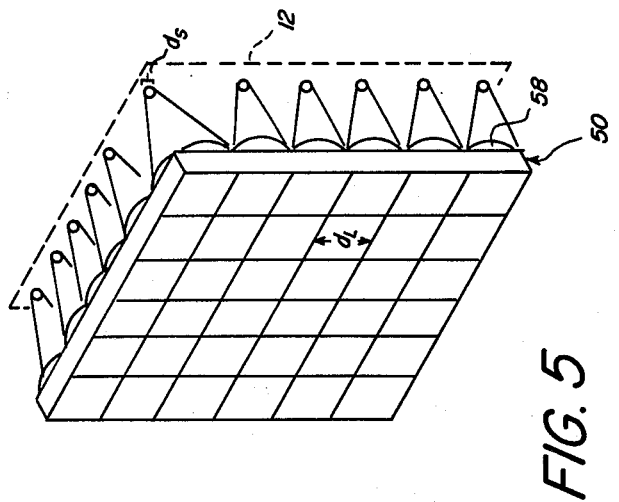
FIG. 5 is a perspective schematic view of another preferred embodiment of area light valve array in accordance with the present invention.
Figure 6:
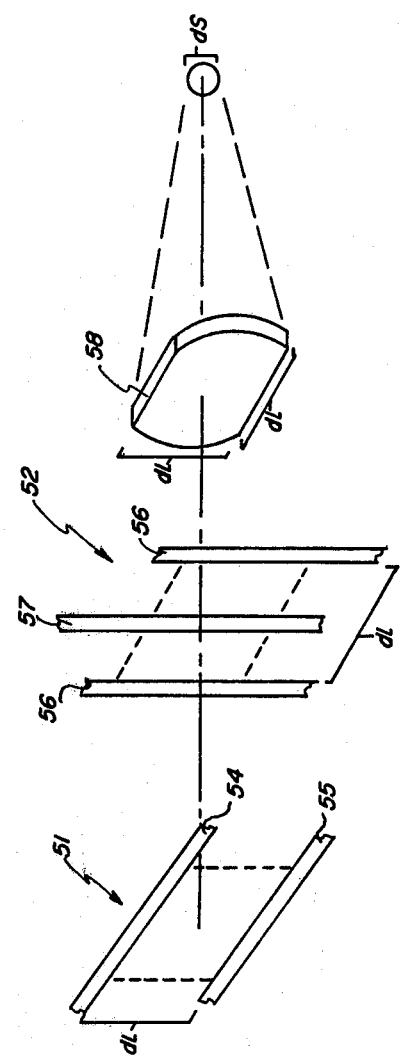
FIG. 6 is a perspective diagram of one pixel portion of the array shown in FIG. 5.

FIGS. 5-7 illustrate an embodiment of the present invention which retains the desirable multiplexing aspect of the present invention but is significantly more light efficient. In this embodiment the light valve array 50 comprises two electrooptic panels 51 and 52 and interleaved polarizing means (not shown) and have a construction such as described in detail in U.S. Patent Application Ser. No. 230,097, entitled "Electronic Imaging Apparatus with Light Valve Area Arrays" and filed Jan. 29, 1981, in the names of Mir, Varner and Kurtz. In general, this construction differs from the FIGS. 3 and 4 device in that electrodes (54 and 55 of panel 51 and 56, 57 of panel 52) which define the active electrooptic strips are much smaller in size (so as to allow maximum light passage). As can be seen in FIG. 6, the electrodes are constructed so that the active electrooptic strips of both modulator panels are linear and disposed in a substantially orthogonal relation. As in FIG. 3, rows of modulator panel 51 of the light valve array 50 are each activated sequentially and the orthogonal columns of the panel 52 are concurrently addressed with image information, for each sequential row address, within each partial-line sub-period.

One skilled in the art will appreciate that the light valve array 50 is more light efficieint than the FIGS. 3, 4 embodiment because the wide opaque electrodes are not utilized. However, it also will be noted that without further modification the pixels of the recording medium exposed by the first horizontal line of the array would be re-exposed by the second and following horizontal rows.

To avoid this problem and maintain light efficiency, this embodiment of the present invention provides two modifications to the light valve structure disclosed in U.S. Ser. No. 230,097. First, a lenslet array 58 is provided to focus light from the light valve array elements of size dL to spots of reduced size (ds) at the exposure zone 12. The spot size which lenticles focus each pixel portion dL by dL of the light valve array is determined by the extent of multiplexing desired, i.e. the number of active rows in the light valve. That is, in order to avoid overlap of pixels it is desirable that each lenslet be adapted to produce focused spots with a diameter $ds \leq dL/M$ where M = the number of elements dL in a column of the light valve array (and also the number of pixels in a partial-line exposure). It is preferred that $ds = dL/M$; however in some applications slight overlap may be desirable and then ds would be somewhat greater than dL/M.

The other necessary modification to the light valve array 50 can be seen most clearly in FIG. 7. As shown, the columns light valve array 50 are located at an oblique angle $\theta$ with respect to the direction (D) of recording medium transport through the exposure station. Referring to FIG. 7 it can be seen that if the array 50 has M elements in a column, each of dimension $dL \times D1$, the preferred angle $\theta$ will have a value $\theta$ such that $\tan \theta = dL/dL.M$ or $\tan \theta = 1/M$.

Thus it will be appreciated that in accordance with the teachings of the present invention various area light valve configurations are useful in providing high resolution pixel exposure of a record medium featuring successive partial-line exposures of a line during its passage through an area exposure zone. It will be understood that equivalent results can be obtained by scanning the array and exposing light source relative to a stationary record medium.

The invention has been described in detail with particular reference to certain preferred embodiments thereof, but it will be understood that variations and modifications can be effected within the spirit and scope of the invention.

What is claimed is:

1. Improved light valve apparatus for simplified, high resolution, electronic imaging, said apparatus comprising:
   (a) means defining an area imaging station having entrance and exit regions;
   (b) means for transporting photosensitive recording medium through said imaging station in a first direction during an overall line exposure period;
   (c) means for directing uniform illumination along an optical path toward said imaging station; and
   (d) an area light valve array disposed between the illumination means and the imaging station and having two electrooptic panels, on which linear electrodes define electrically-activatible, light modulator strips, and sandwiching polarizing means which cooperate with said panels to control light passage in response to the activation of such modulator strips, said panel being located with respective strips generally orthogonal and the strips of one of said panels each extending across the projection of said optical path from said entrance region to said exit region at an oblique angle to said first direction.

2. The invention defined in claim 1 further comprising control means for: (1) receiving an electrical signal containing image information, (2) activating all modulator strips of one of said panels sequentially during each partial-line sub-period of said overall line exposure period and (3) activating all moduator strips of the other of said panels in accordance with partial-line image information for each line at the print station, during each sequential activation of said one panel.

3. Light valve imaging apparatus having a multi-line exposure zone with entrance and exit regions, said apparatus comprising:
   (a) means for moving a photosensitive recording medium through said zone, in a first direction and at a predetermined rate, so that successive lines of such medium progress sequentially from said entrance region to said exit region, during a line exposure period that includes a plurality of partial-line sub-periods;
   (b) illuminating means for directing uniform illumination along an optical path toward said exposure zone;
   (c) a first modulator panel having a plurality of strip electrodes which are spaced to define a plurality of electrooptic strips, each strip comprising a column of commonly activatible pixel portions, said first panel being located so that its columns extend across said optical path, from the projection of said entrance and to the projection of said exit region, at a finite, non-orthogonal angle to said first direction;
   (d) a second modulator panel having a plurality of strip electrodes which are spaced to define a plurality of electrooptic strips, each strip comprising a row of commonly activatible pixel portions, said second panel being located so that its rows extend across said optical path in generally orthogonal relation to the columns of said first panel;
   (e) first, intermediate and third polarizing means, located along said optical path in interleaved relation with said first and second panels, said intermediate polarizing means being crossed with respect to said first and third polarizing means; and
   (f) addressing means, coupled to said electrode means and operable during partial-line sub-periods, for sequentially activating each of the electrooptic strips of one of said panels and for concurrently activating the electrooptic strips of the other of said panels during each such sequential activation and in accordance with electrical signals containing partial-line information for the lines of recording medium then at the exposure zone.

4. In apparatus adapted for electronic imaging of a record medium at an imaging station and having (1) means for transporting successive portions of such medium past said station; (2) means for directing uniform illumination along an optical path toward said station and (3) a light valve array for selectively controlling the passage of such light to pixels of said station, the improvement wherein:
   (a) said image station includes a plurality of pixel regions located in a two-dimensional pattern; and
   (b) said light valve array comprises:
      (i) first and second two-dimensional, electrooptic panels, each panel comprising a plurality of parallel strip portions which are activatible between birefringent and isotropic states in response to application and removal of an electric field, said panels being aligned along said optical path in an optically opposed relation with their respective strip portions in orthogonal relation so as to define a plurality of pixel portions respectively aligned with different pixel regions of said address station; p2 (ii) addressable electrode means for selectively applying discrete electrical fields transversely across respective strip portions;
      (iii) first, second and third light polarizing means aligned along said optical path so that said first panel is optically between said first and second polarizing means and said second panel is optically between said second and third polarizing means, said first and third polarizing means being oriented with their directions of polarization generally aligned and parallel to the plane of said panels and said second polarizing means being optically oriented with its direction of polarization generally parallel to the plane of said panels and orthogonal to those of said first and third polarizing means; and
      (iv) addressing means coupled to said electrode means and operable during successive partial-line sub-periods of exposure for:
         (1) sequentially applying an electrical field to each strip portion of one of said panels; and
         (2) concurrently applying electrical fields to the strip portions of the other of said panels in timed relation with each sequential activation of said one panel and in accordance with electrical signals respectively containing line image information.

5. The invention defined in claim 1, 2, 3 or 4 further comprising a plurality of pixel lens means aligned with respective pixel portions of said electrooptic panels.

6. The invention defined in claim 5 wherein said lens means are adapted to focus such pixel portions at said image station at spot size of about dL/M where dL is the size of a pixel portion and M is the number of line exposure positions at said image station.

7. The invention defined in claim 1, 2, 3 or 4 wherein one of said panels is disposed with the electrooptic strips thereof at an angle $\theta$ to the direction of record medium transport where $\theta$ has a value such that tan $\theta = 1/M$ and M equals the number of line exposure positions at said image station.

8. The invention defined in claim 1, 2, 3 or 4 wherein one of said panels comprises a plurality of opaque strips disposed between electrooptic strips and at an oblique angle with respect to the direction of medium transport through said image station.

* * * * *